(12) United States Patent
Lenzen

(10) Patent No.: US 11,853,714 B2
(45) Date of Patent: Dec. 26, 2023

(54) OPTIMAL METASTABILITY-CONTAINING SORTING VIA PARALLEL PREFIX COMPUTATION

(71) Applicant: MAX-PLANCK-GESELLSCHAFT ZUR FÖRDERUNG DER WISSENSCHAFTEN E.V., Munich (DE)

(72) Inventor: Christoph Lenzen, Saarbrücken (DE)

(73) Assignee: Max-Planck-Gesellschaft zur Förderung D. Wissenschaften e.V., Munich (DE)

(*) Notice: Subject to any disclaimer, the term of this patent is extended or adjusted under 35 U.S.C. 154(b) by 0 days.

(21) Appl. No.: 17/282,675

(22) PCT Filed: Oct. 31, 2019

(86) PCT No.: PCT/EP2019/079861
§ 371 (c)(1),
(2) Date: Apr. 2, 2021

(87) PCT Pub. No.: WO2020/089408
PCT Pub. Date: May 7, 2020

(65) Prior Publication Data
US 2021/0349687 A1   Nov. 11, 2021

(30) Foreign Application Priority Data
Oct. 31, 2018 (EP) .................... 18000850

(51) Int. Cl.
*G06F 7/24* (2006.01)
*G06F 7/40* (2006.01)
*G06F 7/78* (2006.01)

(52) U.S. Cl.
CPC ............ *G06F 7/24* (2013.01); *G06F 7/405* (2013.01); *G06F 7/78* (2013.01); *G06F 2207/228* (2013.01)

(58) Field of Classification Search
CPC ........ G06F 7/24; G06F 7/02; G06F 7/026–08; G06F 7/22–26; G06F 7/405; G06F 2207/228
See application file for complete search history.

(56) References Cited

U.S. PATENT DOCUMENTS 5,781,465 A * 7/1998 Lutz .................. G06F 7/026
                                                            708/671
9,831,888 B1 * 11/2017 Waltari ............... H03M 1/0624

OTHER PUBLICATIONS

WIPO, International Search Report dated Jan. 27, 2020 in International Appln. No. PCT/EP2019/079861, (3 p.).
WIPO, Written Opinion dated Dec. 19, 2019 in International Appln. No. PCT/EP2019/079861, (6 p.).
WIPO, International Preliminary Report dated Dec. 8, 2020 in International Appln. No. PCT/EP2019/079861, (7 p.).
Bund et al., "Optimal Metastability-Containing Sorting Networks," arxiv.org, Jan. 22, 2018, pp. 1-6.
Friedrichs et al., "Metastability-Containing Circuits," arxiv.org, Jun. 21, 2016, pp. 1-29.

(Continued)

*Primary Examiner* — Matthew D Sandifer
(74) *Attorney, Agent, or Firm* — Siritzky Law, PLLC

(57) ABSTRACT

In order to provide smaller, faster and less error-prone circuits for sorting possibly metastable inputs, a novel sorting circuit is provided. According to the invention, the circuit is metastability-containing.

5 Claims, 15 Drawing Sheets

(56) References Cited

OTHER PUBLICATIONS

Lenzen et al., "Efficient Metastability-Containing Gray Code 2-Sort," 2016 22nd IEE International Symposium on Asynchronous Circuits and Systems, May 8, 2016, pp. 49-56.
David Harris, "A Taxonomy of Parallel Prefix Networks," Conference Record of the 37th Asilomar Conference on Signals, vol. 2, Nov. 9, 2003, pp. 2213-2217.

* cited by examiner (a) Recursion tree $T_A$ with separated aggregation trees and added buffers.

(b) Recursive patterns $R_r$ and $R_c$.

FIG. 11

| | | | | |
|---:|---|---|---|---|
| /comparison/g | 010X | 0X10 | 01X1 | 1011 |
| /comparison/h | 0101 | 0011 | 010X | 00X1 |
| /comparison/max_nonmc | 010X | 0X10 | 01XX | 1011 |
| /comparison/min_nonmc | 010X | 0011 | 01XX | 00X1 |
| /comparison/max_mc | 010X | 0X10 | 010X | 1011 |
| /comparison/min_mc | 0101 | 0011 | 01X1 | 00X1 |

FIG. 13

TABLE 1: 4-bit binary reflected Gray code

| # | $g_1, g_{2,4}$ | # | $g_1, g_{2,4}$ | # | $g_1, g_{2,4}$ | # | $g_1, g_{2,4}$ |
|---|---|---|---|---|---|---|---|
| 0 | 0 000 | 4 | 0 110 | 8  | 1 100 | 12 | 1 010 |
| 1 | 0 001 | 5 | 0 111 | 9  | 1 101 | 13 | 1 011 |
| 2 | 0 011 | 6 | 0 101 | 10 | 1 111 | 14 | 1 001 |
| 3 | 0 010 | 7 | 0 100 | 11 | 1 110 | 15 | 1 000 |

FIG. 14

TABLE 2: 4-bit valid inputs

| $g$ | $\langle g \rangle$ | $g$ | $\langle g \rangle$ | $g$ | $\langle g \rangle$ | $g$ | $\langle g \rangle$ |
|---|---|---|---|---|---|---|---|
| 0000 | 0 | 0110 | 4 | 1100 | 8  | 1010 | 12 |
| 000M | – | 011M | – | 110M | – | 101M | – |
| 0001 | 1 | 0111 | 5 | 1101 | 9  | 1011 | 13 |
| 00M1 | – | 01M1 | – | 11M1 | – | 10M1 | – |
| 0011 | 2 | 0101 | 6 | 1111 | 10 | 1001 | 14 |
| 001M | – | 010M | – | 111M | – | 100M | – |
| 0010 | 3 | 0100 | 7 | 1110 | 11 | 1000 | 15 |
| 0M10 | – | M100 | – | 1M10 | – | –    | –  |

FIG. 15

TABLE 3: Extensions to metastable inputs of AND (left), OR (center), and an inverter (right) according to Kleene logic.

| a\b | 0 | 1 | M |
|---|---|---|---|
| 0 | 0 | 0 | 0 |
| 1 | 0 | 1 | M |
| M | 0 | M | M |

| a\b | 0 | 1 | M |
|---|---|---|---|
| 0 | 0 | 1 | M |
| 1 | 1 | 1 | 1 |
| M | M | 1 | M |

| $a$ | $\bar{a}$ |
|---|---|
| 0 | 1 |
| 1 | 0 |
| M | M |

FIG. 16
Table 4

| $s^{(i-1)}$ | $\max^{\mathrm{rg}}\{g,h\}_i$ | $\min^{\mathrm{rg}}\{g,h\}_i$ |
|---|---|---|
| 00 | $\max\{g_i, h_i\}$ | $\min\{g_i, h_i\}$ |
| 10 | $g_i$ | $h_i$ |
| 11 | $\min\{g_i, h_i\}$ | $\max\{g_i, h_i\}$ |
| 01 | $h_i$ | $g_i$ |

FIG. 17
Table 5

(a) The $\diamond$ operator.

| $\diamond$ | 00 | 01 | 11 | 10 |
|---|---|---|---|---|
| 00 | 00 | 01 | 11 | 10 |
| 01 | 01 | 01 | 01 | 01 |
| 11 | 11 | 10 | 00 | 01 |
| 10 | 10 | 10 | 10 | 10 |

(b) The out operator.

| out | 00 | 01 | 11 | 10 |
|---|---|---|---|---|
| 00 | 00 | 10 | 11 | 10 |
| 01 | 00 | 10 | 11 | 01 |
| 11 | 00 | 01 | 11 | 01 |
| 10 | 00 | 01 | 11 | 10 |

FIG. 18
Table 6

| $\diamond_*$ | 00 | 0M | 01 | M1 | 11 | 1M | 10 | M0 | MM |
|---|---|---|---|---|---|---|---|---|---|
| 00 | 00 | 0M | 01 | M1 | 11 | 1M | 10 | M0 | MM |
| 0M | 0M | 0M | 01 | M1 | M1 | MM | MM | MM | MM |
| 01 | 01 | 01 | 01 | 01 | 01 | 01 | 01 | 01 | 01 |
| M1 | M1 | MM | MM | MM | 0M | 0M | 01 | M1 | MM |
| 11 | 11 | 1M | 10 | M0 | 00 | 0M | 01 | M1 | MM |
| 1M | 1M | 1M | 10 | M0 | M0 | MM | MM | MM | MM |
| 10 | 10 | 10 | 10 | 10 | 10 | 10 | 10 | 10 | 10 |
| M0 | M0 | MM | MM | MM | 1M | 1M | 10 | M0 | MM |
| MM | MM | MM | MM | MM | MM | MM | MM | MM | MM |

FIG. 19
Table 7

| $out_x$ | 00 | 0M | 01 | M1 | 11 | 1M | 10 | M0 | MM |
|---|---|---|---|---|---|---|---|---|---|
| 00 | 00 | M0 | 10 | 1M | 11 | 1M | 10 | M0 | MM |
| 0M | 00 | M0 | 10 | 1M | 11 | MM | MM | MM | MM |
| 01 | 00 | M0 | 10 | 1M | 11 | M1 | 01 | 0M | MM |
| M1 | 00 | MM | MM | MM | 11 | M1 | 01 | 0M | MM |
| 11 | 00 | 0M | 01 | M1 | 11 | M1 | 01 | 0M | MM |
| 1M | 00 | 0M | 01 | M1 | 11 | MM | MM | MM | MM |
| 10 | 00 | 0M | 01 | M1 | 11 | 1M | 10 | M0 | MM |
| M0 | 00 | MM | MM | MM | 11 | 1M | 10 | 0M | MM |
| MM | 00 | MM | MM | MM | 11 | MM | MM | MM | MM |

FIG. 20

Table 8

| $sel_1$ | $sel_2$ | $x$ | $y$ | $\text{XMUX}(sel_1, sel_2, a, b)$ |
|---|---|---|---|---|
| $b_1$ | $\bar{b}_1$ | $\bar{s}_2$ | $s_1$ | $(s \diamond_{\aleph} b)_1$ |
| $b_2$ | $\bar{b}_2$ | $\bar{s}_1$ | $s_2$ | $(s \diamond_{\aleph} b)_2$ |
| $\bar{s}_1$ | $\bar{s}_2$ | $b_2$ | $b_1$ | $\text{out}_{\aleph}(s, b)_1$ |
| $s_2$ | $s_1$ | $b_1$ | $b_2$ | $\text{out}_{\aleph}(s, b)_2$ |

FIG. 21
Table 9

| B | Circuit | 4-sort | | | 7-sort | | | 10-sort₁# | | | 10-sort₃ | | |
|---|---|---|---|---|---|---|---|---|---|---|---|---|---|
| | | gates | area | delay | gates | area | delay | gates | area | delay | gates | area | delay |
| 2 | our work | 65 | 87.402 | 357 | 208 | 270.741 | 714 | 377 | 506.912 | 912 | 403 | 541.968 | 833 |
| | Bin-comp | 40 | 77.91 | 478 | 128 | 249.326 | 953 | 232 | 451.815 | 1284 | 248 | 483 | 1145 |
| 4 | our work | 275 | 368.941 | 640 | 880 | 1179.529 | 1014 | 1595 | 2137.985 | 1235 | 1705 | 2285.514 | 1183 |
| | Bin-comp | 95 | 172.935 | 906 | 304 | 553.28 | 1810 | 551 | 1002.848 | 2429 | 589 | 1072.099 | 2143 |
| 8 | our work | 845 | 1136.184 | 1386 | 2704 | 3636.08 | 1921 | 4901 | 6560.283 | 2179 | 5239 | 7044.541 | 2059 |
| | Bin-comp | 205 | 368.641 | 1473 | 656 | 1179.528 | 2948 | 1189 | 2137.905 | 3945 | 1271 | 2285.514 | 3470 |
| 16 | our work | 2035 | 2739.961 | 2369 | 6512 | 8767.374 | 3396 | 11803 | 15891.12 | 4030 | 12617 | 16987.194 | 3844 |
| | Bin-comp | 405 | 530.67 | 1298 | 1296 | 2425.99 | 2680 | 2349 | 4397.085 | 3474 | 2511 | 4703.304 | 3850 |

FIG. 22
Table 10

| $i$ | 0 | 1 | 2 | 3 | 4 | 5 | 6 | 7 | 8 | 9 |
|---|---|---|---|---|---|---|---|---|---|---|
| $g_i h_i$ | | 11 | 00 | 11 | 0M | 11 | 00 | 10 | 10 | 00 |
| $s_M^{(i)}$ | 00 | 11 | 11 | 00 | 0M | M1 | M1 | 01 | 01 | 00 |
| $g_i' h_i'$ | | 11 | 00 | 11 | M0 | 11 | 00 | 01 | 01 | 00 |

OPTIMAL METASTABILITY-CONTAINING SORTING VIA PARALLEL PREFIX COMPUTATION

RELATED APPLICATIONS

This application is a 371 of International application PCT/EP2019/079861, filed 31 Oct. 2019, the entire contents of which are hereby fully incorporated herein by reference for all purposes. PCT/EP2019/079861 claims the priority benefit of European patent application EP 18000850.0, filed 31 Oct. 2018, the entire contents of which are hereby fully incorporated herein by reference for all purposes.

STATEMENT REGARDING SPONSORED RESEARCH

The project leading to this application has received funding from the European Research Council (ERC) under the European Union's Horizon 2020 research and innovation programme (grant agreement No 716562).

The present invention relates to metastability-containing circuits for sorting an arbitrary number of inputs.

INTRODUCTION

Metastability is a fundamental obstacle when crossing clock domains, potentially resulting in soft errors with critical consequence. As it has been shown that metastability cannot be avoided deterministically, synchronizers are employed to reduce the error probability to tolerable levels. This approach trades precious time for reliability: the more time is allocated for metastability resolution, the smaller the probability of metastability-induced faults.

Recently, a different approach has been proposed, coined metastability-containing (MC) circuits (S. Friedrichs, M. Függer and C. Lenzen, "Metastability-Containing Circuits," in IEEE Transactions on Computers, vol. 67, no. 8, pp. 1167-1183, 1 Aug. 2018). It accepts a limited amount of metastability in the input to a digital circuit and ensures limited metastability of its output, so that the result is still useful. In particular when sorting inputs, metastability can be contained when sorting inputs arising from time-to-digital converters, i.e., measurement values can be correctly sorted without resolving metastability using synchronizers first.

RELATED WORK

Sorting Networks: Sorting networks sort n inputs from a totally ordered universe by feeding them into n parallel wires that are connected by 2-sort elements, i.e., subcircuits sorting two inputs; these can act in parallel whenever they do not depend on each other's output. A correct sorting network sorts all possible inputs, i.e., the wires are labeled 1 to n such that the $i^{th}$ wire outputs the $i^{th}$ element of the sorted list of inputs. The size of a sorting network is its number of 2-sort elements and its depth is the maximum number of 2-sort elements an input may pass through until reaching the output.

Parallel Prefix Computation: Ladner and Fischer (R. E. Ladner, M. J. Fischer, "Parallel prefix computation", JACM, vol. 27, no. 4, pp. 831-838, 1980) studied the parallel application of an associative operator to all prefixes of an input string of length l (over an arbitrary alphabet). They give parallel prefix computation (PPC) circuits of depth O(log l) and size O(l) (given a constant-size circuit implementing the operator). A number of additional constructions have been developed for adders, and special cases of the construction by Ladner and Fischer were discovered (in all likelihood) independently, cf. [24]. However, no other construction simultaneously achieves asymptotically optimal depth and size.

It is an object of the invention to provide smaller, faster and less error-prone circuits for sorting possibly metastable inputs.

This object is achieved by a circuit according to independent claim 1. Advantageous embodiments are defined in the dependent claims.

According to an aspect of the invention, CMOS implementations of basic gates realize Kleene logic. The task of comparing inputs can be decomposed into performing a four-valued comparison on each prefix pair of two input strings, followed by inferring the corresponding output bits. Plugging the resulting 2-sort(B) circuits for B-bit inputs into a sorting network for n values readily yields an MC sorting circuit for n valid strings.

The above reduces the task of MC sorting to a parallel prefix computation (PPC) problem, for which circuits that are simultaneously (asymptotically) optimal in depth and size are known due to a celebrated result by Ladner and Fischer (Richard E Ladner and Michael J Fischer. Parallel Prefix Computation. JACM, 27(4):831-838, 1980). According to an aspect of the invention, the inventive circuits can be derived using their framework, which allows for a trade-off between depth and size of the 2-sort circuit. Most prominently, optimizing for depth reduces the depth of the circuit to optimal $\lceil \log B \rceil$, at the expense of increasing the size by a factor of up to 2. However, relying on the construction from Ladner at al. as-is results in a very large fan-out. In a further aspect, the invention proposes reducing fan-out to any number f≥3 without affecting depth, increasing the size by a factor of only 1+O(1/f) (plus at most 3B/2 buffers). In particular, our results imply that the depth of an MC sorting circuit can match the delay of a non-containing circuit, while maintaining constant fan-out and a constant-factor size overhead.

Post-layout area and delay of the designed circuits compare favorably with a baseline provided by a straightforward non-containing implementation.

BRIEF DESCRIPTION OF DRAWINGS

FIG. 11 shows an excerpt from a simulation for 4-bit inputs, where X=M. The rows show (from top to bottom) the inputs g and h, both outputs of the simple non-containing circuit, and both outputs of our design. Inputs g and h are randomly generated valid strings. Columns 1 and 3 show that the simpler design fails to implement a 2-sort(4) circuit.

FIGS. 13 to 16 depict Tables 1 to 4, respectively;
FIG. 17 depicts Tables 5a and 5b; and
FIGS. 18 to 22 depict Tables 6 to 10, respectively.

DETAILED DESCRIPTION

Figure 1:
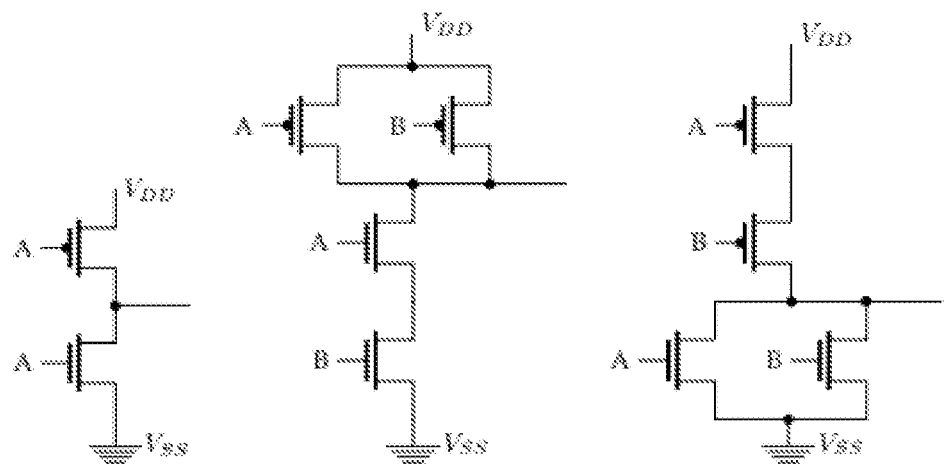
FIG. 1 shows standard transistor-level implementations of inverter (left), NAND (center), and NOR (right) gates in CMOS technology. The latter can be turned into AND and OR, respectively, by appending an inverter.

We set $[N]:=\{0, \ldots, N-1\}$ for $N \in \mathbb{N}$ and $[i,j]=\{i, i+1, \ldots, j\}$ for $i, j \in \mathbb{N}$, $i \leq j$. We denote $\mathbb{B}:=\{0, 1\}$ and $\mathbb{B}_M:=\{0,1, M\}$. For a B-bit string $g \in \mathbb{B}_M$ and $i \in [1,B]$, denote by $g_i$ its i-th bit, i.e., $g=g_1 g_2 \ldots g_B$. We use the shorthand $g_{i,j}:=g_i \ldots g_j$, where $i, j \in [1,B]$ and $i \leq j$. Let par(g) denote the parity of $g \in \mathbb{B}^B$, i.e, $par(g)=\sum_{i=1}^B g_i \mod 2$. For a function f and a set A, we abbreviate $f(A):=\{f(y) | y \in A\}$.

A standard binary representation of inputs is unsuitable: uncertainty of the input values may be arbitrarily amplified by the encoding. E.g. representing a value unknown to be 11 or 12, which are encoded as 1011 resp. 1100, would result in the bit string 1MMM, i.e., a string that is metastable in every position that differs for both strings. However, 1MMM may represent any number in the interval from 8 to 15, amplifying the initial uncertainty of being in the interval from 11 to 12. An encoding that does not lose precision for consecutive values is Gray code.

A B-bit binary reflected Gray code, $rg_B:[N] \to \mathbb{B}$, is defined recursively. For simplicity (and without loss of generality) we set $N:=2^B$. A 1-bit code is given by $rg_1(0)=0$ and $rg_1(1)=1$. For B>1, we start with the first bit fixed to 0 and counting with $rg_{B-1}(\bullet)$ (for the first $2^{B-1}$ codewords), then toggle the first bit to 1, and finally "count down" $rg_{B-1}(\bullet)$ while fixing the first bit again, cf. Table 1 (FIG. 13). Formally, this yields for $x \in [N]$ $$rg_B(x) := \begin{cases} 0 \, rg_{B-1}(x) & \text{if } x \in [2^{B-1}] \\ 1 \, rg_{B-1}(2^B - 1 - x) & \text{if } x \in [2^B] \setminus [2^{B-1}] \end{cases} \quad (x)$$

As each B-bit string is a codeword, the code is a bijection and the encoding function also defines the decoding function. Denote by $\langle \bullet \rangle : \mathbb{B}^B \to [N]$ the decoding function of a Gray code string, i.e., for $x \in [N]$, $\langle rg_B(x) \rangle = x$.

For two binary reflected Gray code strings $g, h \in \mathbb{B}^B$, we define their maximum and minimum as $$(\max{}^{rg}\{g, h\}, \min{}^{rg}\{g, h\}) := \begin{cases} (g, h) & \text{if } \langle g \rangle \geq \langle h \rangle \\ (h, g) & \text{if } \langle g \rangle < \langle h \rangle \end{cases}$$

For example:

$\max{}^{rg}\{0011,0100\}=\max{}^{rg}\{rg_B(2),rg_B(7)\}=0100,$ $\min{}^{rg}\{0111,0101\}=\min{}^{rg}\{rg_B(9),rg_B(10)\}=0111.$ Inputs to the sorting circuit may have some metastable bits, which means that the respective signals behave out-of-spec from the perspective of Boolean logic. However, they are valid strings in the sense of the invention. Valid strings have at most one metastable bit. If this bit resolves to either 0 or 1, the resulting string encodes either x or x+1 for some x, cf. Table 2 (FIG. 14).

More formally, if $B \in \mathbb{N}$ and $N=2^B$, the set of valid strings of length B is defined as $$S_{rg}^B := rg_B([N]) \cup \bigcup_{x \in [N-1]} \{rg_B(x) * rg_B(x+1)\}$$

The operator * is called the superposition and is defined as $$\forall i \in \{1, \ldots, B\}(x * y)_i := \begin{cases} x_i & \text{if } x_i = y_i \\ M & \text{else.} \end{cases}$$

The specification of $\max{}^{rg}$ and $\min{}^{rg}$ may be extended to valid strings in the above sense by taking all possible resolutions of metastable bits into account. More particularly, in order to extend the specification of $\max{}^{rg}$ and $\min{}^{rg}$ to valid strings, the metastable closure (Stephan Friedrichs, Matthias Függer, and Christoph Lenzen. Metastability-Containing Circuits. Transactions on Computers, 67, 2018) is used. The metastable closure of an operator on binary inputs extends it to inputs that may contain metastable bits, by considering all possible stable resolutions of the inputs, applying the operator and taking the superposition of the results.

The closure is the best one can achieve w.r.t. containing metastability with clocked logic using standard registers, i.e., when $f_M(x)_i=M$, no such implementation can guarantee that the $i^{th}$ output stabilizes in a timely fashion.

If one wants to construct a circuit computing the maximum and minimum of two valid strings, allowing to build sorting networks for valid strings, one also needs to answer the question what it means to ask for the maximum or minimum of valid strings. To this end, suppose a valid string is $rg_B(x)*rg_B(x+1)$ for some $x \in [N-1]$, i.e., the string contains a metastable bit that makes it uncertain whether the represented value is x or x+1. If one waits for metastability to resolve, the string will stabilize to either $rg_B(x)$ or $rg_B(x+1)$. Accordingly, it makes sense to consider $rg_B(x)*rg_B(x+1)$ "in between" $rg_B(x)$ and $rg_B(x+1)$, resulting in the following total order on valid strings (cf. Table 2, FIG. 14).

Definition (<). A total order < is defined on valid strings as follows. For g, $h \in \mathbb{B}^B$, $g < h \Leftrightarrow \langle g \rangle < \langle h \rangle$. For each $x \in [N-1]$, we define $rg_B(x) < rg_B(x)*rg_B(x+1) < rg_B(x+1)$. We extend the resulting relation on $S_{rg}^B \times S_{rg}^B$ to a total order by taking the transitive closure. Note that this also defines ≤, via $g \leq h \Leftrightarrow (g=h \lor g<h)$.

We intend to sort with respect to this order. It turns out that implementing a 2-sort circuit w.r.t. this order amounts to implementing the metastable closure of $max^{rg}$ and $min^{rg}$. In other words, $max_M^{rg}$ and $min_M^{rg}$ are the max and min operators w.r.t. the total order on valid strings shown in Table 2 (FIG. 14), e.g., $$max_M^{rg}\{1001,1000\}=rg_4(15)=1000,$$

$$max_M^{rg}\{0M10,0010\}=rg_4(3)*rg_4(4)=0M10, \text{ and}$$

$$max_M^{rg}\{0M10,0110\}=rg_4(4)=0110.$$

Hence, our task is to implement $max_M^{rg}$ and $min_M^{rg}$.

Definition (2-sort(B)). For $B \in \mathbb{N}$, a 2-sort(B) circuit is specified as follows.
  Input: g, $h \in S_{rg}^B$
  Output: g', $h' \in S_{rg}^B$
  Functionality: $g'=max_M^{rg}\{g, h\}$, $h'=min_M^{rg}\{g, h\}$.

FIG. 1 shows standard transistor-level implementations of inverter (left), NAND (center), and NOR (right) gates in CMOS technology. The latter can be turned into AND and OR, respectively, by appending an inverter.

The invention seeks to use standard components and combinational logic only. In particular, the behavior of basic gates on metastable inputs may be specified via the metastable closure of their behavior on binary inputs, cf. Table 3 (FIG. 15), using the standard notational convention that $a+b=OR_M(a,b)$ and $ab=AND_M(a,b)$. In this logic, most familiar identities hold: AND and OR are associative, commutative, and distributive, and DeMorgan's laws hold. However, naturally the law of the excluded middle becomes void. For instance, in general, $OR(x, \bar{x}) \neq 1$, as $OR(M,M)=M$.

It can be shown that the basic CMOS gates shown in FIG. 1 behave according to this logic, i.e. that they implement the truth tables given in Table 3 (FIG. 15), thereby justifying the model.

Figure 2:
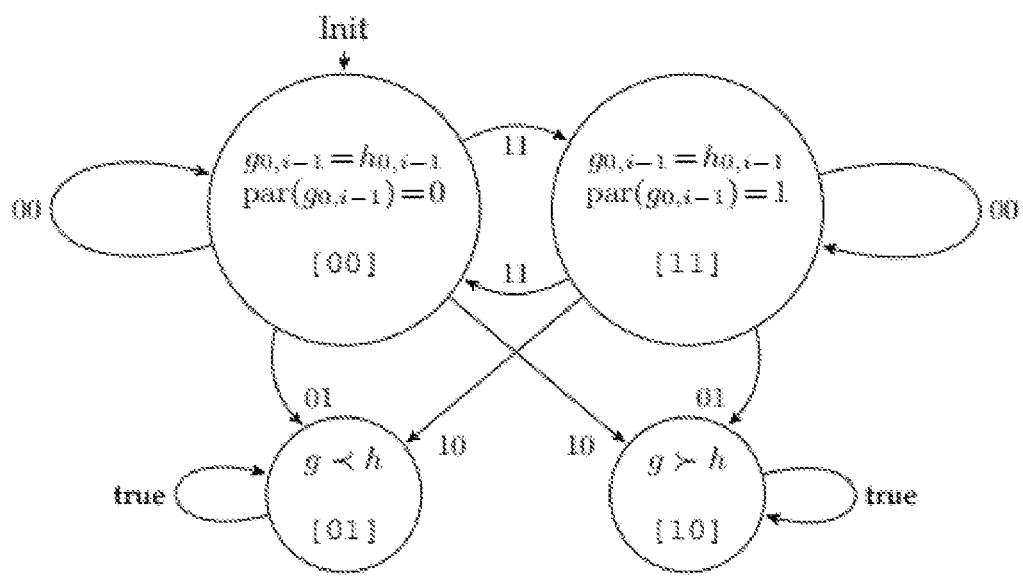
FIG. 2 shows finite state machine determining which of two Gray code inputs g, h∈$B^B$ is larger. In each step, the machine receives $g_i h_i$ as input. State encoding is given in square brackets.

FIG. 2 shows finite state machine determining which of two Gray code inputs g, $h \in B^B$ is larger. In each step, the machine receives $g_i h_i$ as input. State encoding is given in square brackets.

More particularly, FIG. 2 depicts a finite state machine performing a four-valued comparison of two Gray code strings. In each step of processing inputs g, $h \in BB$, it is fed the pair of ith input bits $g_i h_i$. In the following, we denote by $s^{(i)}(g,h)$ the state of the machine after i steps, where $s^{(0)}(g, h):=00$ is the starting state. For ease of notation, we will omit the arguments g and h of $s^{(i)}$ whenever they are clear from context.

Because the parity keeps track of whether the remaining bits are compared w.r.t. the standard or "reflected" order, the state machine performs the comparison correctly w.r.t. the meaning of the states indicted in FIG. 2.

For all $i \in [1,B]$, we have that max $$rg\{g, h\}_i min^{rg}\{g, h\}_i = \text{out}\left(\mathop{\Diamond}_{j=1}^{i-1} g_j h_j, g_i h_i\right)$$

In order to extend this approach to potentially metastable inputs, all involved operators are replaced by their metastable closure: for $i \in [1, B]$ (i) compute $s^{(i)}$, (ii) determine $max^{rg}\{g, h\}_i$ and $min^{rg}\{g, h\}_i$ according to Table 4 (FIG. 16), and finally (iii) exploit associativity of the operator computing the state s(i) in the PPC framework. Thus, we only need to implement $\Diamond_M$ and the $out_M$ (both of constant size), plug them into the framework, and immediately obtain an efficient circuit.

The reader may raise the question why we compute $s_M^{(i)}$ for all $i \in [09, B-1]$ instead of computing only $s_M^{(B)}$ with a simple tree of $\Diamond_M$ elements, which would yield a smaller circuit. Since $s_M^{(B)}$ is the result of the comparison of the entire strings, it could be used to compute all outputs, i.e., we could compute the output by $out(s_M^{(B)}, g_i h_i)$ instead of $out(s^{(i-1)M}, g_i h_i)$. However, in case of metastability, this may lead to incorrect results: e.g., for g=0M1 and h=001, we have that $s_M^{(3)}=00*01=0M$ and $out_M(0M; g_2 h_2)=MM$, yet $min_M^{rg}\{g, h\}_2=0$ (see Tables 6 and 7 (FIGS. 18 and 19)).

While it is not obvious that this approach yields correct outputs, it may be formally proven that: (P1) $\Diamond_M$ is associative. (P2) repeated application of $\Diamond_M$ computes $s_M^{(i)}$. (P3) applying $out_M$ to $s_M^{(i-1)}$ and $g_i h_i$ results for all valid strings in $max_M^{rg}\{g, h\}_i min_M^{rg}\{g, h\}_i$. This yields the desired correctness. Regarding the first point, we note the statement that $\Diamond_M$ is associative does not depend on B. In other words, it can be verified by checking for all possible x, y, $z \in B_M^2$ whether $(x \Diamond_M y) \Diamond_M z = x \Diamond_M (y \Diamond_M z)$.

While it is tractable to manually verify all $3^6=729$ cases (exploiting various symmetries and other properties of the operator), it is tedious and prone to errors. Instead, it was verified that both evaluation orders result in the same outcome by a short computer program, proving the desired associativity of the operator.

For the convenience of the reader, Table 6 (FIG. 18) gives the truth table of $\Diamond_M$. It can be shown that repeated application of this operator to the input pairs $g_j h_j, j \in [1, i]$, actually results in $s_M^{(i)}$. This is closely related to the elegant recursive structure of Binary Reflected Gray Code, leading to the important observation that if in a valid string there is a metastable bit at position m, then the remaining B−m following bits are the maximum code word of a (B−m)-bit code.

It may be observed that for $g \in S_{rg}^B$, if there is an index $1 \le m < B$ such that $g_m = M$ then $g_{m+1,B} = 10^{B-m-1}$.

The reasoning is based on distinguishing two main cases: one is that $s_M^{(i)}$ contains at most one metastable bit, the other that $s_M^{(i)}MM$. Each of these cases can be proven by technical statements.

It may further be observed that if $|\text{res}(s_M^{(i)})| \le 2$ for any $i \in [B+1]$, then $\text{res}(s_m^{(i)}) = \diamond_{j=1}^i \text{res}(g_j h_j)$.

The operator out: $B^2 \times B^2 \to B^2$ is the operator given in Table 4 (FIG. 16) computing $\max^{rg}\{g, h\}_i$, $\min^{rg}\{g, h\}_i$, out of $s^{(i-1)}$ and $g_i h_i$. For convenience of the reader we provide the truth table of $\text{out}_M$ in Table 7 (FIG. 19).

Figure 3:
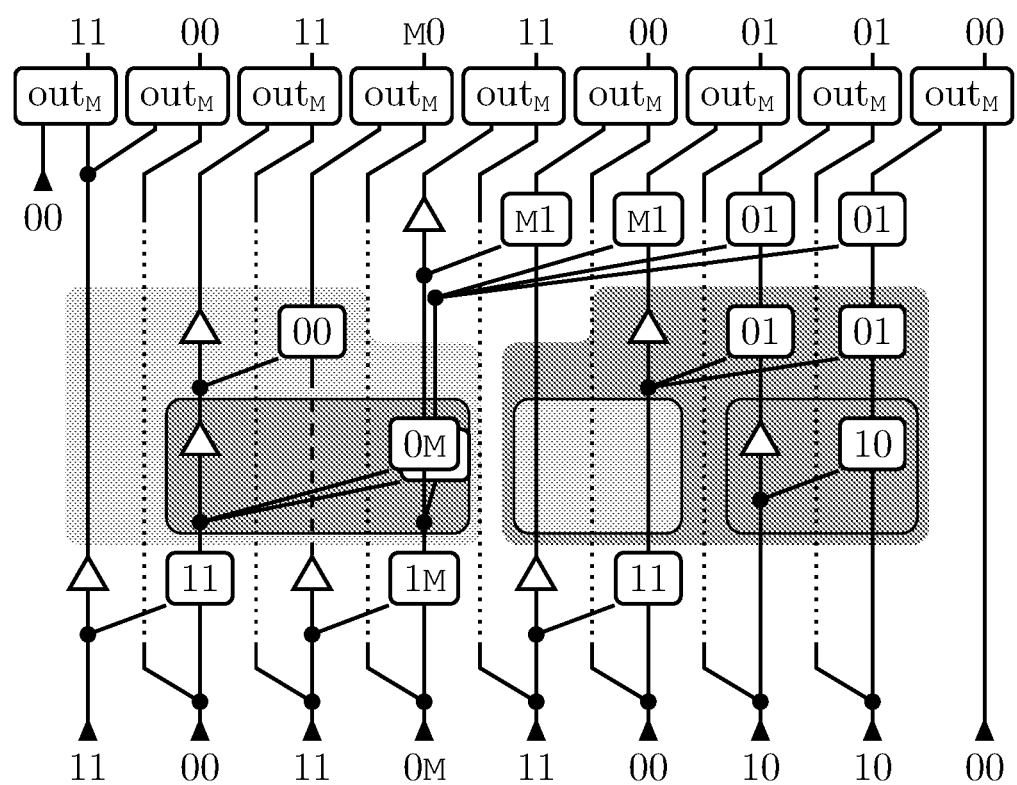
FIG. 3 shows An example for a computation of the 2-sort(9) circuit arising from the inventive construction for fan-out f=3. The inputs are g=101010110 and h=101M100000; see Table 10 (FIG. 22) for $s_M{}^i(g,h)$ and the output. We labeled each ◊M by its output. Buffers and duplicated gates (here the one computing 0M) reduce fan-out, but do not affect the computation. Grey boxes indicate recursive steps of the PPC construction; see also FIG. 7 for a larger PPC circuit using the one here in its "right" top-level recursion. For better readability, wires not taking part in a recursive step are dashed or dotted.

FIG. 3 shows an example for a computation of the 2-sort(9) circuit arising from the inventive construction for fan-out f=3. The inputs are g=101010110 and h=101M100000; see Table 10 (FIG. 22) for $s_M^i(g,h)$ and the output. More particularly, table 10 (FIG. 22) shows an example run of the FSM in FIG. 2 on inputs g=101010110 and h=101M100000. We drop $s_M^{(9)}s(9)M$, as it is not needed to compute $g'_9 h'_9$. We labeled each $\diamond M$ by its output. Buffers and duplicated gates (here the one computing 0M) reduce fan-out, but do not affect the computation. Grey boxes indicate recursive steps of the PPC construction; see also FIG. 7 for a larger PPC circuit using the one here in its "right" top-level recursion. For better readability, wires not taking part in a recursive step are dashed or dotted.

In order to derive a small circuit from the above, we make use of the PPC framework by Ladner and Fischer. They described a generic method that is applicable to any finite state machine translating a sequence of B input symbols to B output symbols, to obtain circuits of size O(B) and depth O(log B). They reduce the problem to a parallel prefix computation (PPC) task by observing that each input symbol defines a restricted transition function, whose compositions evaluated on the starting state yield the state of the machine after the corresponding number of steps. This matches our needs, as we need to determine $s_M^{(i)}$ for each $i \in [B]$. However, their generic construction involves large constants. Fortunately, we have established that $\diamond_M: B_M^2 \times B_M^2$ is an associative operator, permitting us to directly apply the circuit templates for associative operators they provide for computing $s_M^{(i)} = (\diamond_M)_{j=1}^i g_j h_j$ for all $i \in [B]$. Accordingly, only these templates are discussed.

We revisit the part of the framework relevant to our construction, also providing a minor improvement on their results in the process. To this end, we first formally specify the PPC task for the special case of associative operators.

Definition 5.1 ($PPC_\oplus(B)$). For associative $\oplus: D \times D \to D$ and $B \in N$, a $PPC_\oplus(B)$ circuit is specified as follows.

Input: $d \in D^B$,
Output: $\pi \in D^B$,
Functionality: $\pi_i = \oplus_{j=1}^i d_j$ for all $i \in [1, B]$.

In our case, $\oplus = \diamond_M$ and $D = B_M^2$ the method by Ladner et al. provides a family of recursive constructions of $PPC_\oplus$ circuits. They are obtained by combining two different recursive patterns.

Figure 4:
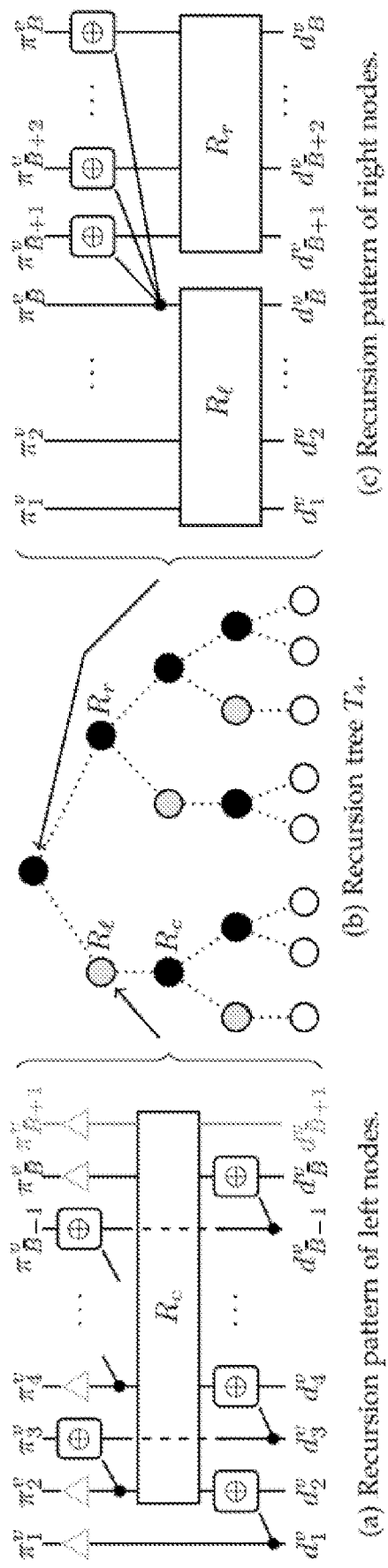
FIGS. 4A-4C show the recursion tree T4 (center). Right nodes are depicted black, left nodes gray and leafs are depicted white. The recursive patterns applied at left and right nodes are shown on the left and right, respectively. At the root and its left child, we have that $\overline{B}=B/2$; for other nodes, $\overline{B}$ gets halved for each step further down the tree (where the leaves simply wire their single input to their single output). The left pattern comes in different variants. The basic construction does not incorporate the gray buffers; these will be needed in Section 5.2 to reduce fan-out. The gray wire with index $\overline{B}+1$ is present only if B is odd; this never occurs in $PPC(C,T_b)$, but becomes relevant when initially applying the left pattern exclusively for $k \in \mathbb{N}$ steps (see Theorem 5.8), reducing the size of the resulting circuit at the expense of increasing its depth by k.

FIG. 4 shows the recursion tree T4 (center). Right nodes are depicted black, left nodes gray and leaves are depicted white. The recursive patterns applied at left and right nodes are shown on the left and right, respectively. At the root and its left child, we have that $\overline{B} = B/2$; for other nodes, $\overline{B}$ gets halved for each step further down the tree (where the leaves simply wire their single input to their single output). The left pattern comes in different variants. The basic construction does not incorporate the gray buffers; these will be needed to reduce fan-out. The gray wire with index $\overline{B}+1$ is present only if B is odd; this never occurs in $PPC(C, T_b)$, but becomes relevant when initially applying the left pattern exclusively for $k \in N$ steps, reducing the size of the resulting circuit at the expense of increasing its depth by k.

More particularly, suppose that C and P are circuits implementing $\oplus$ and $PPC_\oplus(\lceil B/2 \rceil)$ for some $B \in N$, respectively. Then applying the recursive pattern given at the left of FIG. 4 (i) with $\overline{B} := B$ and without the rightmost gray line if B is even and (ii) with $\overline{B} := B-1$ if B is odd yields a $PPC_\oplus(B)$ circuit. It has depth $2d(C) + d(P)$ and size at most $(B-1)|C| + |P|$. Moreover, the last output is at depth at most $d(C) + d(P)$ of the circuit.

The second recursive pattern, shown in FIG. 4c, avoids to increase the depth of the circuit beyond the necessary $d(C)$ for each level of recursion. Assume for now that B is a power of 2. We represent the recursion as a tree $T_b$, where $b := \log B$, given in the center of FIG. 6A. It has depth b with all leafs in this depth, and there are two types of nonleaf nodes: right nodes (filled in black) have two children, a left and a right node, whereas left nodes (filled in gray) have a single child, which is a right node. $T_b$ is essentially a Fibonacci tree in disguise.

Definition. $T_0$ is a single leaf. $T_1$ consists of the (right) root and two attached leaves. For $b \ge 2$, $T_b$ can be constructed from $T_{b-1}$ and $T_{b-2}$ by taking a (right) root r, attaching the root of $T_{b-1}$ as its right child, a new left node l as the left child of r, and then attaching the root of $T_{b-2}$ as (only) child of l.

The recursive construction is now defined as follows. A right node applies the pattern given in FIG. 4 to the right, where $R_l$ is the circuit (recursively) defined by the subtree rooted at the left child, $R_r$ is the circuit (recursively) defined by the subtree rooted at the right child, and $\overline{B} = 2^{b-d-1}$, where $d \in [b]$ is the depth of the node. A left child applies the pattern on the left, where the recursively used circuit $R_c$ is defined by the subtree rooted at its child and $\overline{B} = 2^{b-d}$, where $d \in [b]$ is the depth of the node. The base case for a single input and output is simply a wire connecting the input to the output, for both patterns. As $b = \log B$ and each recursive step cuts the number of inputs and outputs in half, the base case applies if and only if the node is a leaf. Note that the figure shows the recursive patterns at the root and its left child, where $\overline{B} = 2^{b-1}$ is always even (i.e., in this recursive pattern, the gray wire with index $\overline{B}+1$ is never present); when applying the patterns to nodes further down the tree, $\overline{B}$ and B are scaled down by a factor of 2 for every step towards the leaves.

In the following, denote by $PPC(C, T_b)$ the circuit that results from applying the recursive construction described above to the base circuit C implementing $\oplus$. Moreover, we refer to the $i^{th}$ input and output of the subcircuit corresponding to node $v \in T_b$ as $d_i^v$ and $\pi_i^v$, respectively.

It may be shown that If C implements $\oplus$, $PPC(C, T_b)$ is a $PPC_\oplus(2^b)$ circuit and $PPC(C, T_b)$ has depth $b \cdot d(C)$.

It remains to bound the size of the circuit. Denote by $F_i$, $i \in N$, the $i^{th}$ Fibonacci number, i.e., $F_1 = F_2 = 1$ and $F_{i+1} = F_i + F_{i-1}$ for all $2 \le i \in N$. Then it may be shown that $PPC(C, T_b)$ has size $(2^{b+2} - F_{b+5} + 1)|C|$.

Asymptotically, the subtractive term of $F_{b+5}$ is negligible, as $F_{b+5} \in (1/\sqrt{5} + 0(1))((1 + \sqrt{5})/2)^{b+5} \subseteq O(1.62^b)$; however, unless B is large, the difference is substantial. We also get a simple upper bound for arbitrary values of B. To this end, we "split" in the recursion such that the left branch is "complete," while applying the same splitting strategy on the right. This is where our construction differs from and improves on the method of Ladner et al. They perform a balanced split and obtain an upper bound of 4B on the circuit size.

It follows that for $B \in \mathbb{N}$ and circuit C implementing $\oplus$, set $b:=\lceil \log B \rceil$. Then a $PPC_\oplus(B)$ of depth $\lceil \log B \rceil d(C)$ and size smaller than $(5B-2^b-F_{b+3})|C| \le (4B-F_{b+3})$ exists.

We remark that one can give more precise bounds by making case distinctions regarding the right recursion, which for the sake of brevity we omit here. Instead, we computed the exact numbers for $B \le 70$.

Figure 5:
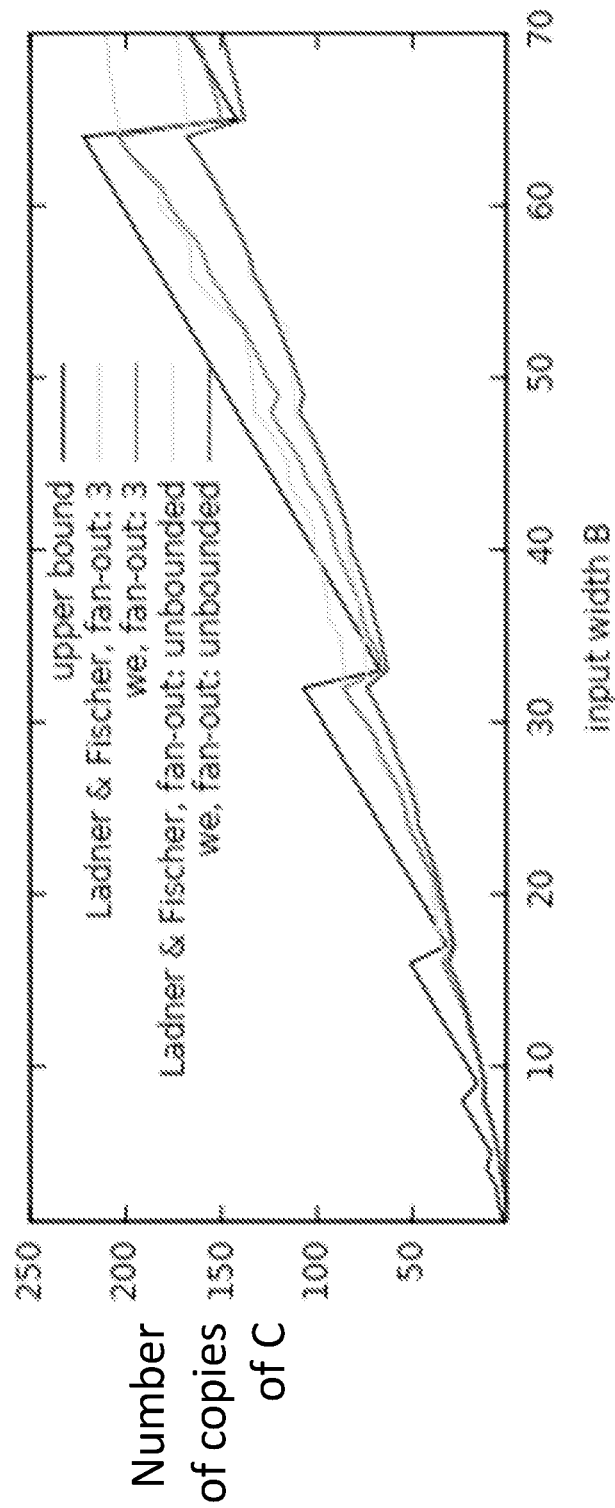
FIG. 5 shows comparison of the balanced recursion from [19] and ours. The curves for unbounded fan-out are the exact sizes obtained, whereas "upper bound" refers to the bound from Corollary 5.7; the fan-out 3 curves show that the unbalanced strategy performs better also for the construction from Theorem 5.18 (for f=3 and k=0) we derive next.

FIG. 5 shows comparison of the balanced recursion from Ladner et al and ours. The curves for unbounded fan-out are the exact sizes obtained, whereas "upper bound" refers to the above-given bound; the fan-out 3 curves show that the unbalanced strategy performs better also for the construction (for f=3 and k=0) we derive next.

The construction derived from iterative application of the above results can be combined with $PPC(C,T_b)$, achieving the following trade-off; note that if $B=2^b$ for $b \in \mathbb{N}$, then $F_{\lceil \log B \rceil - k+3}$ can be replaced by $F_{b-k+5}$.

Suppose C implements $\oplus$. For all $k \in [\lceil \log B \rceil +1]$ and $b \in \mathbb{N}$, there is a $PPC_\oplus(B)$ circuit of depth $(\lceil \log B \rceil +k)d(C)$ and size at most $$\left(\left(2 + \frac{1}{2^{k-1}}\right)B - F_{\lceil \log B \rceil - k+3}\right)|C|$$

Figures 6A, 6B:
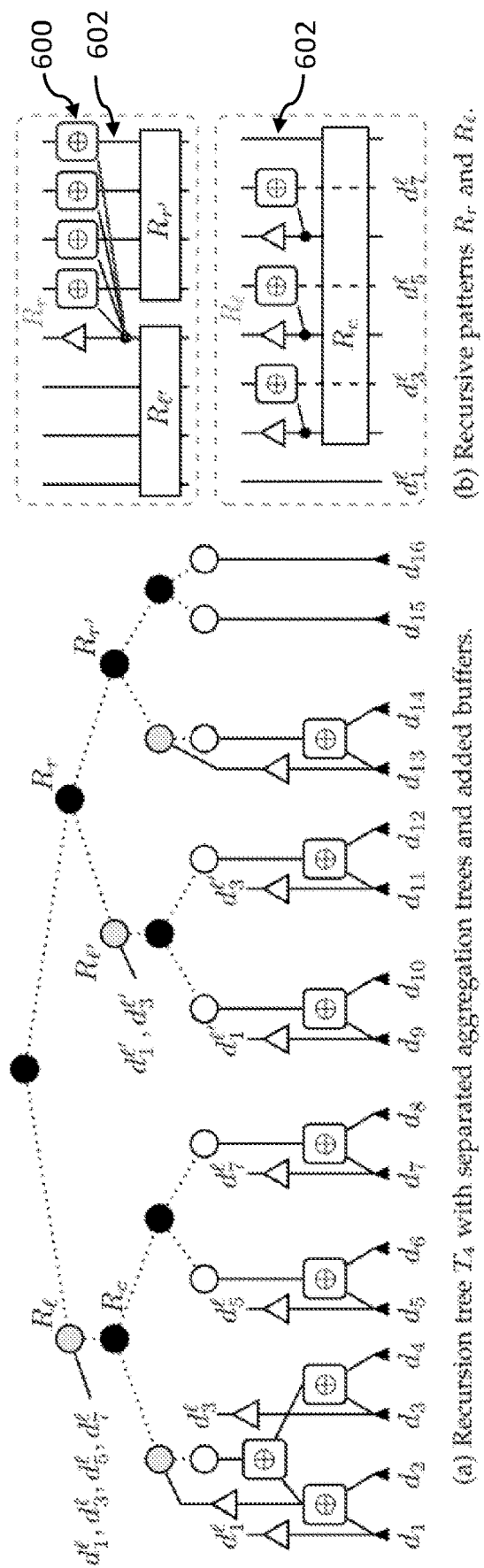
FIGS. 6A and 6B show construction of $PPC(C,T_4)'$. On the left (FIG. 6A), we see the recursion tree, with the aggregation trees separated and shown at the bottom. Inputs are depicted as black triangles. On the right (FIG. 6B), the application of the recursive patterns at the children of the root is shown. Parts 600, 602 will be duplicated in the second step of the construction that achieves constant fan-out; this will also necessitate duplicating some gates in the aggregation trees.

FIGS. 6A and 6B show the construction of $PPC(C,T_4)'$. On the left (FIG. 6A), we see the recursion tree, with the aggregation trees separated and shown at the bottom. Inputs are depicted as black triangles. On the right (FIG. 6B), the application of the recursive patterns at the children of the root is shown. Parts 600, 602 will be duplicated in the second step of the construction that achieves constant fan-out; this will also necessitate duplicating some gates in the aggregation trees.

The optimal depth construction incurs an excessively large fan-out of $\Theta(B)$, as the last output of left recursive calls needs to drive all the copies of C that combine it with each of the corresponding right call's outputs. This entails that, despite its lower depth, it will not result in circuits of smaller physical delay than simply recursively applying the construction from FIG. 4A. Naturally, one can insert buffer trees to ensure a constant fan-out (and thus constantly bounded ratio between delay and depth), but this increases the depth to $\Theta(\log^2 B + d(C)\log B)$.

We now modify the recursive construction to ensure a constant fan-out, at the expense of a limited increase in size of the circuit. The result is the first construction that has size $O(B)$, optimal depth, and constant fan-out.

In the following, we denote by $f \ge 3$ the maximum fanout we are trying to achieve, where we assume that gates or memory cells providing the input to the circuit do not need to drive any other components. For simplicity, we consider C to be a single gate.

We proceed in two steps. First, we insert 2B buffers into the circuit, ensuring that the fan-out is bounded by 2 everywhere except at the gate providing the last output of each subcircuit corresponding to a right node. In the second step, we will resolve this by duplicating such gates sufficiently often, recursively propagating the changes down the tree. Neither of these changes will affect the output of the circuit or its depth, so the main challenges are to show our claim on the fan-out and bounding the size of the final circuit.

Step 1: Almost Bounding Fan-Out by 2

Before proceeding to the construction in detail, we need some structural insight on the circuit.

For node $v \in T_b$, define its range $R_v$ and left-count $\alpha_v$ recursively as follows.

If $v$ is the root, then $R_v=[1,2^b]$ and $\alpha_v=0$.

If $v$ is the left child of p with $R_p=[i, i+j]$, then $R_v=[i, i+(j+1)/2]$ and $\alpha_v=\alpha_p$.

If $v$ is the right child of right node p with $R_p=[i, i+j]$, then $R_v=[i+(j+1)/2+1, i+j]$ and $\alpha_v=\alpha_p$.

If $v$ is the right child of left node p, then $R_v=R_p$ and $\alpha_v=\alpha_p+1$.

Suppose the subcircuit of $PPC(C,T_b)$ represented by node $v \in T_b$ in depth $d \in [b+1]$ has range $R_v=[i, i+j]$.

Then
(i) it has $2^{b-d}$ inputs,
(ii) $j=2^{b-d+\alpha_v}-1$,
(iii) if $v$ is a right node, all its inputs are outputs of its childrens' subcircuits, and
(iv) if $v$ is a left node or leaf, only its even inputs are provided by its child (if it has one) and for odd $k \in [1, 2^{b-d}]$, we have that $$d_k^v = \bigoplus_{k'=i+(k-1)}^{i+k2^{\alpha_v}-1} 2^{\alpha_v} d_{k'}.$$

This leads to an alternative representation of the circuit $PPC(C,T_b)$, see FIGS. 6A-6B, in which we separate gates in the recursive pattern from FIG. 4A that occur before the subcircuit $R_c$. Adding the buffers we need in our construction, this results in the modified patterns given in FIG. 6B. The separated gates appear at the bottom of FIG. 6A: for each leaf $v$ of $T_b$, there is a tree of depth $\alpha_v$ aggregating all of the circuit's inputs from its range. Each non-root node in an aggregation tree provides its output to its parent. In addition, one of the two children of an inner node in the tree must provide its output as an input to one of the subcircuits corresponding to a node of $T_b$, cf. Property (iv) above.

From this representation, we will derive that the following modifications of $PPC(C,T_b)$ result in a $PPC_\oplus(2^b)$ circuit $PPC(C,T_b)'$, for which a fan-out larger than 2 exclusively occurs on the last outputs of subcircuits corresponding to nodes of $T_b$.

1) Add a buffer on each wire connecting a non-root node of any of the aggregation trees to its corresponding subcircuit (see FIG. 6A).
2) For the subcircuit corresponding to left node l with range $R_l=[i, i+j]$, add for each even $k \le j$ (i.e., each even k but the maximum of j+1) a buffer before output $\pi_k^l$ (see bottom of FIG. 6B).
3) For each right node r with range $[i, i+j]$, add a buffer before output $\pi_{(j+1)/2}^r$ (see top of FIG. 6B).

With the exception of gates providing the last output of subcircuits corresponding to nodes of $T_b$ (600, 602 in FIG. 6B), fan-out of $PPC(C,T_b)'$ is 2. Buffers or gates driving an output of the circuit drive nothing else.

It remains to count the inserted buffers. The following helper statement will be useful for this, but also later on.

Denote by $L_b \subseteq T_b$ the set of leaves of $T_b$. Then $|L_b|=F_{b+2}$ and $\Sigma_{v \in L_b} 2^{\alpha_v} = 2^b$.

Next, consider the recurrence given by $L'_0=1$, $L'_1=2$, and $L'_b=L'_{b-1}+2L'_{b-2}$ for $b \ge 2$; the factor of 2 assigns twice the weight to the subtree rooted at the child of the root's left child, thereby ensuring that each leaf is accounted for with weight $2^{\alpha_v}$. This recurrence has solution $2^b$.

Denote by s the size of a buffer. Then $$|PPC(C,T_b)'|=|PPC(C,T_b)|+(2^b+2^{b-1}-F_{b+3})s.$$

Step 2: Bounding Fan-Out by f

In the second step, we need to resolve the issue of high fan-out of the last output of each recursively used sub circuit in $PPC(C,T_b)'$. Our approach is straightforward. Starting at the root of $T_b$ and progressing downwards, we label each node $\upsilon$ with a value $\alpha(\upsilon)$ that specifies a sufficient number of additional copies of the last output of the sub circuit represented by $\upsilon$ to avoid fan-out larger than f. At right nodes, this is achieved by duplicating the gate computing this output sufficiently often, 600, 602 in FIG. 6B (top). For left nodes, we simply require the same number of duplicates to be provided by the sub circuit represented by their child (i.e., we duplicate the 602 wire in the bottom recursive pattern shown in FIG. 6B). Finally, for leaves, we will require a sufficient number of duplicates of the root of their aggregation tree; this, in turn, may require to make duplicates of their descendants in the aggregation tree.

We start by defining $\alpha(\upsilon)$ and then argue how to use these values for modifying the circuit to obtain our fan-out f circuit. Afterwards, we will analyze the increase in size of the circuit compared to $PPC(C,T_b)'$.

Definition ($\alpha(\upsilon)$). Fix $b \in \mathbb{N}_0$. For $v \in T_b$ in depth $d \in [b+1]$, define $$a(v) := \begin{cases} 0 & \text{if } v \text{ is the root} \\ \frac{a(p)+2^{b-d}}{f} & \text{if } v \text{ is the left child of } p \\ \frac{a(p)}{f} & \text{if } v \text{ is the right child of right node } p \\ p & \text{if } v \text{ is the (only) child of left node } p. \end{cases}$$

Suppose that for each leaf $v \in T_b$, there are $\lfloor a(v) \rfloor$ additional copies of the root of the aggregation tree, and for each right node $v \in T_b$, we add $\lfloor a(v) \rfloor$ gates that compute (copies of) the last output of their corresponding sub circuit of $PPC(C,T_b)'$. Then we can wire the circuit such that all gates that are not in aggregation trees have fan-out at most f, and each output of the circuit is driven by a gate or buffer driving only this output.

It remains to modify the aggregation trees so that sufficiently many copies of the roots' output values are available.

Consider an aggregation tree corresponding to leaf $v \in T_b$ and fix $f \geq 3$. We can modify it such that the fan-out of all its non-root nodes becomes at most f, there are $\lfloor a(v) \rfloor$ additional gates computing the same output as the root, and at most $(fa(v))/(f-2)+(2^{\alpha_v-1})/(f-1)$ gates are added.

Finally, we need to count the total number of gates we add when implementing these modifications to the circuit.

For $f \geq 3$, define $PPC^{(f)}(C,T_b)$ by modifying $PPC(C,T_b)'$ according to Lemmas 5.15 and 5.16. Then, with $\lambda_1 := (1+\sqrt{5})/4$, $|PPC^{(f)}(C,T_b)|$ is bounded by $$|PPC(C,T_b)'| + 2^b\left(\frac{1}{2f-2} + \frac{2}{f-2} + O\left(\frac{\lambda_1^b}{f^2}\right)\right)|C|.$$

We summarize our findings in the following:

Suppose that C implements $\oplus$, buffers have size s and depth at most $d(C)$, and set $\lambda_1 := (1+\sqrt{5})/4$. Then for all $k \in [b+1]$, $b \in \mathbb{N}_0$ and $f \geq 3$, there is a $PPC_\oplus(2^b)$ circuit of fan-out f, depth $(b+k)d(C)$, and size at most $$\left(2^{b+1} + 2^{b-k}\left(2 + \frac{5f-6}{2f^2-6f+4} + O\left(\frac{\lambda_1^b}{f^2}\right)\right)\right)|C| + (2^b + 2^{b-k-1})s.$$

Due to space constraints, we refrain from analyzing the size of the construction for values of B that are not powers of 2. However, in FIG. 8 we plot the exact bounds (without buffers) for k=0 and selected values of f against B.

Figure 7:
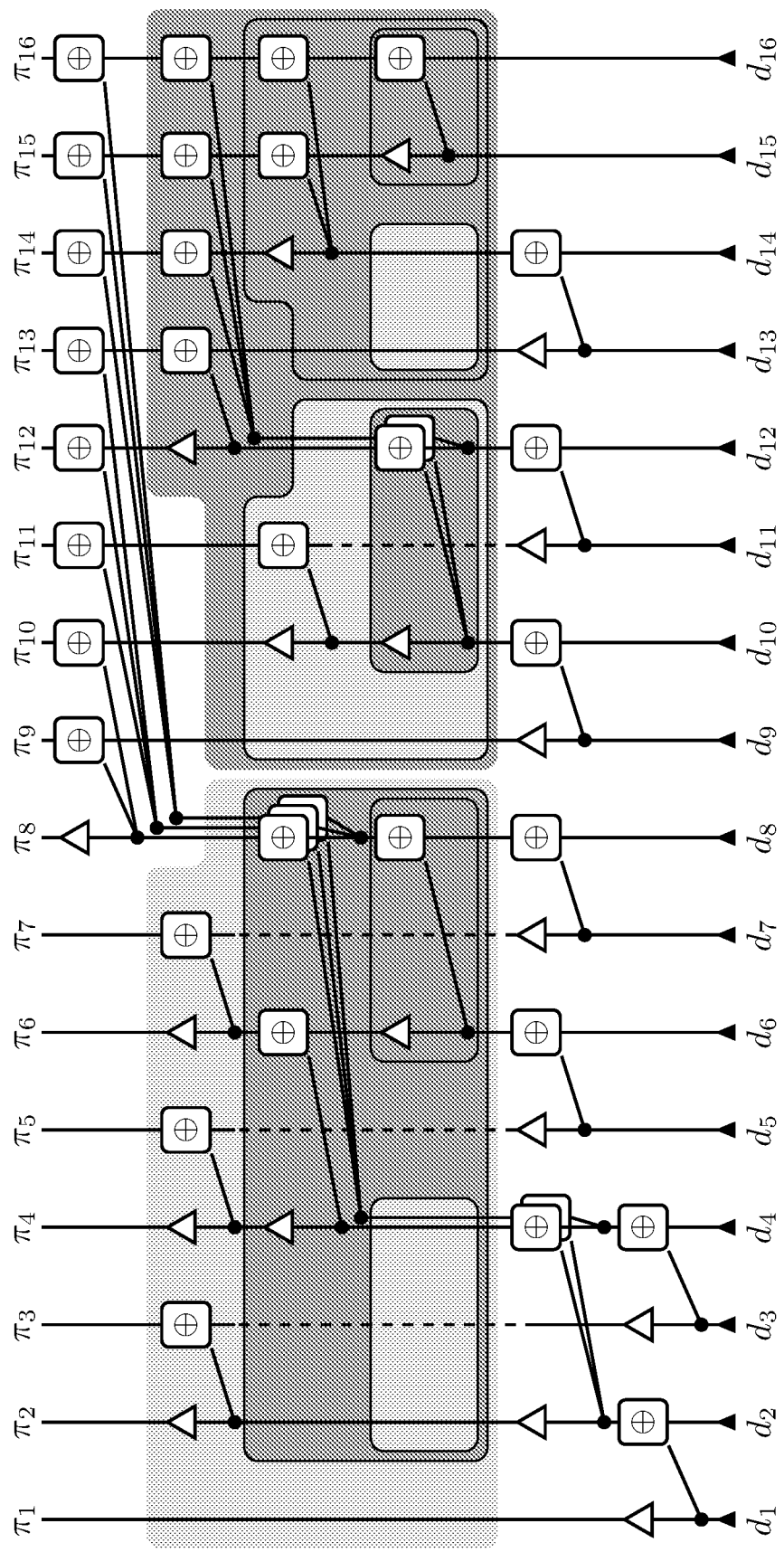
FIG. 7 shows $PPC(^{(3)})(C,T_4)$. Right recursion steps $R_r$ are marked with dark gray, left recursion steps with light gray. The steps at the root (above) and aggregation trees (below) are not marked explicitly. Duplicated gates are depicted in a layered fashion. Dashed lines indicate that a wire is not participating in a recursive step.

FIG. 7 shows, as an example for the overall resulting construction, $PPC^{(3)}(C,T_4)$. Right recursion steps $R_r$ are marked with dark gray, left recursion steps with light gray. The steps at the root (above) and aggregation trees (below) are not marked explicitly. Duplicated gates are depicted in a layered fashion. Dashed lines indicate that a wire is not participating in a recursive step.

Figure 8:
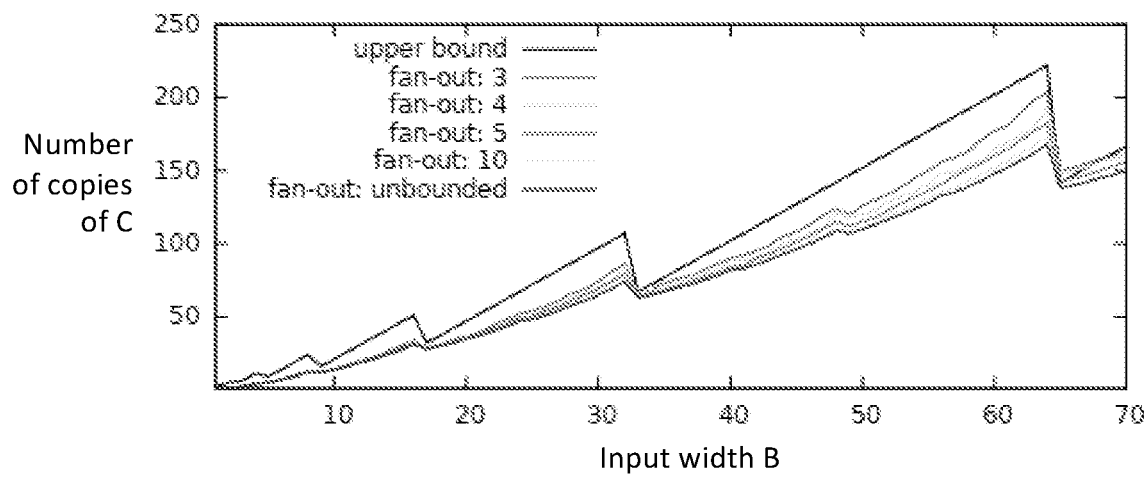
FIG. 8 shows a dependence of the size of the modified construction on f. For comparison, the upper bound from Corollary 5.7 on the circuit with unbounded fan-out is shown as well.

FIG. 8 shows a dependence of the size of the modified construction on f. For comparison, the upper bound on the circuit with unbounded fan-out is shown as well.

Figure 9:
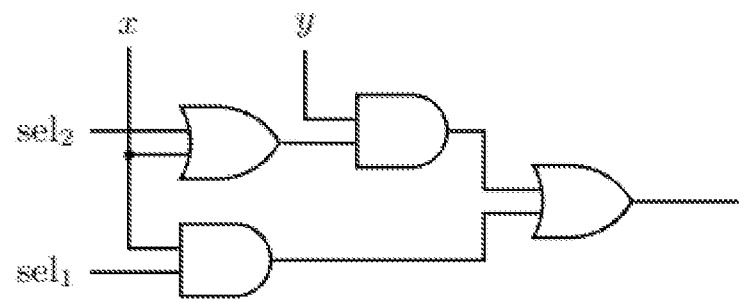
FIG. 9 shows an XMUX circuit according to an embodiment of the invention, used to implement $\diamond_M$ and $out_M$.

FIG. 9 shows an XMUX circuit according to an embodiment of the invention, used to implement $\Diamond_M$ and $out_M$.

First, we need to specify implementations of the sub circuits computing $\Diamond_M$ and $out_M$.

From Tables 5a and 5b (FIG. 17), for s, $b \in B^2$ we can extract the Boolean formulas $(s \Diamond b)_1 = s_1\bar{s}_2 + s_1\bar{b}_1 + \bar{s}_2 b_1$ $(s \Diamond b)_2 = \bar{s}_1 s_2 + \bar{s}_1 b_2 + s_2 b_2$ $out(s,b)_1 = \bar{s}_1 b_2 + \bar{s}_2 b_1 + b_1 b_2$ $out(s,b)_2 = s_1 b_2 + s_2 b_1 + b_1 b2.$ In general, realizing a Boolean formula f by replacing negation, multiplication, and addition by inverters, AND, and OR gates, respectively, does not result in a circuit implementing $f_M$[1] However, we can easily verify that the above formulas are disjunctions of all prime implicants of their respective functions. As one can manually verify, these formulas evaluate to the truth tables given in Tables 6 and 7 (FIGS. 18 and 19) and in this special case the resulting circuits do implement the closure—provided the gates behave as in Table 3 (FIG. 15), which the implementations given in FIG. 2 do. Using distributive laws (recall that these also hold in Kleene logic), the above formulas can be rewritten as $(s \Diamond b)_1 = s_1(\bar{s}_2 + \bar{b}_1) + \bar{s}_2 b_1$ $(s \Diamond b)_2 = s_2(\bar{s}_1 + \bar{b}_2) + \bar{s}_1 b_2$ $out(s,b)_1 = b_1(b_2 + \bar{s}_2) + b_2 \bar{s}_1$ $out(s,b)_2 = b_2(b_1 + s_1) + b_1 s_2.$

[1] For instance, $(s \Diamond b)_1 = s_1 b_1 + \bar{s}_2 b_1$ as Boolean formula, but the two expressions differ when evaluated on $s_1 = \bar{s}_2 = 1$ and $b_1 = M$. The circuits resulting from the different formulas are implementations of a multiplexer (with select bit b1) and its closure, respectively.

We see that, in fact, a single circuit with suitably wired (and possibly negated) inputs can implement all four operations. As for $sel_1 = \overline{sel_2}$ the circuit implements a multiplexer with select bit $sel_1$, we refer to it as extended multiplexer, or XMUX for short. Its functionality is specified by XMUX$(sel_1, sel_2, x, y) := y(x+sel_2) + x \, sel_1$.

Table 8 (FIG. 20) lists how to map inputs to compute $\Diamond_M$ and $out_M$.

We note that this circuit is not a particularly efficient XMUX implementation; a transistor-level implementation would be much smaller. However, our goal here is to verify correctness and give some initial indication of the size of the resulting circuits—a fully optimized ASIC circuit is beyond the scope of this article. The size of the implementation may be slightly reduced by moving negations. Due to space limitations, we refrain from detailing this modification here, but note that FIG. 12 and table 9 (FIG. 21) consider it.

We now have all the pieces in place to assemble a containing 2-sort(B) circuit. As stated above, $\diamond_M$ is associative. Thus, from a given implementation of $\diamond_M$ (e.g., two copies of the circuit from FIG. 9 with appropriate wiring and negation, cf. Table 8 (FIG. 20)) we can construct $PPC_{\diamond_M}$(B-1) circuits of small depth and size, as shown above. We can combine such a circuit with an $out_M$ implementation (again, two XMUXes with appropriate wiring and negation will do) to obtain our 2-sort(B) circuit.

Figure 10:
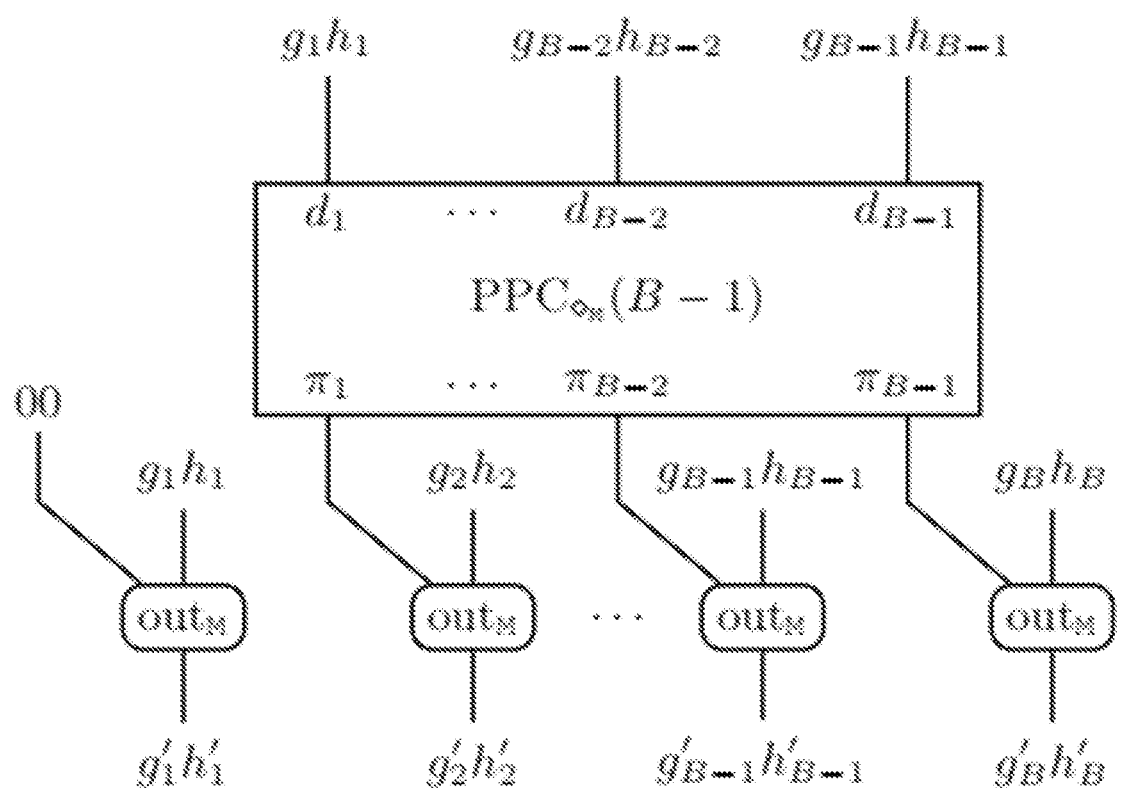
FIG. 10 shows constructing 2-sort(B) from $out_M$ and PPCM(B−1).

FIG. 10 shows constructing 2-sort(B) from $out_M$ and PPCM(B-1).

The correctness of this construction follows from the above explanations, where we can plug in any $PPC_{\diamond_M}$(B-1) circuit. For the circuits derived by relying on the XMUX circuit from FIG. 9, we independently confirmed this via simulation.

More particularly, we implemented the design given in FIG. 10 on register transfer-level using the $PPC_{\diamond_M}$(B-1) circuit described above for k=0.[3] Quartus by Altera was used for design entry, which in our case mainly consists of checking correct implementation. After design entry, we used ModelSim by Altera for behavioral simulation. Note that we must not simulate the preprocessed Quartus output, because processing may compromise metastability-containing behavior. Instead, we simulate pure VHDL. Metastable signals are simulated using VHDL signal X, because its behavior matches the worst-case behavior assumed for M.

FIG. 11 shows an excerpt from a simulation for 4-bit inputs, where X=M. The rows show (from top to bottom) the inputs g and h, both outputs of the simple non-containing circuit, and both outputs of our design. Inputs g and h are randomly generated valid strings. Columns 1 and 3 show that the simpler design fails to implement a 2-sort(4) circuit.

For the implementation of $PPC_{\diamond_M}$(B-1) we used the basic circuits, i.e., we did not make use of the extension to constant fan-out. We exhaustively checked the design from FIG. 10 for B up to 12 (and all k accordingly). Simulation shows that the design works correct for several levels of recursion, e.g., when regarding B=1 and B=2 as simple base cases, B=12 implies 3 levels of recursion for both patterns. We refrained from simulating the constant fan-out construction, because it simply repeats replicates intermediate results without adding functionality.

After behavioral simulation we continue with a comparison of our design and a standard sorting approach Bin-comp (B). As mentioned earlier, the 2-sort(B) implementation given in FIG. 9 is slightly optimized by pulling out a negation from the operators in every recursive step [3]. After design entry as described above we use Encounter RTL Compiler for synthesis and Encounter for place and route. Both tools are part of the Cadence tool set and in both steps we use NanGate 45 nm Open Cell Library as a standard cell library.

Since metastability-containing circuits may include additional gates that are not required in traditional Boolean logic, Boolean optimization may compromise metastability containing properties. Accordingly, we were forced to disable optimization during synthesis of the circuits.

Figure 12:
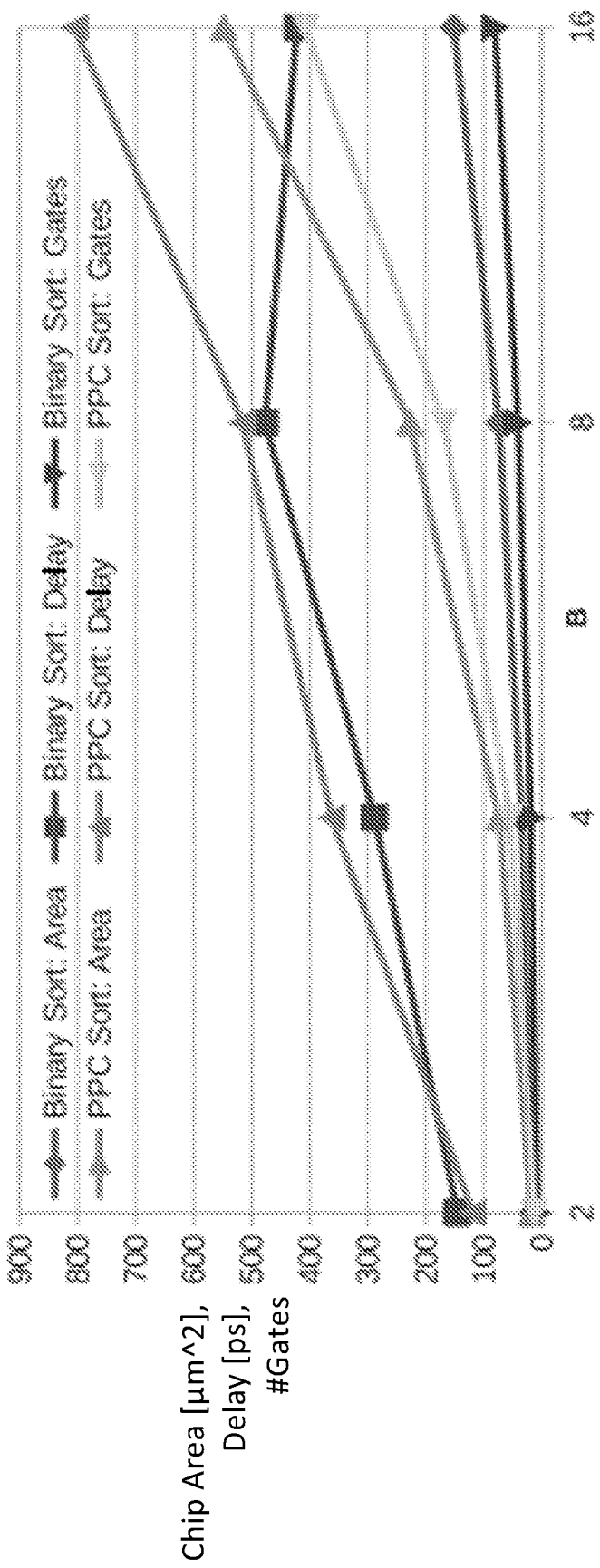
FIG. 12 shows a comparison of the inventive solution PPC Sort to a standard non-containing one. For the latter, the unexpected delay reduction at B=16 is the result of automatic optimization with more powerful gates, which the inventive solution does not use.

FIG. 12 shows a comparison of the inventive solution PPC Sort to a standard non-containing one. For the latter, the unexpected delay reduction at B=16 is the result of automatic optimization with more powerful gates, which the inventive solution does not use.

As a binary benchmark Bin-comp was used: In short, Bin-comp consists of a simple VHDL statement comparing two binary encoded inputs and outputting the maximum and the minimum, accordingly. It follows the same design process as 2-sort, but then undergoes optimization using a more powerful set of basic gates. For example, the standard cell library provides prebuilt multiplexers. These multiplexers are used by Bin-comp, but not by 2-sort. We stress that these more powerful gates provide optimized implementations of multiple Boolean functions, yet each of them is still counted as a single gate. Thus, comparing our design to the binary design in terms of gate count, area, and delay disfavors our solution. Moreover, we noticed that the optimization routine switches to employing more powerful gates when going from B=8 to B=16 (cf. FIG. 12), resulting in a decrease of the delay of the Bin-comp implementation.

Nonetheless, our design performs comparably to the non-containing binary design in terms of delay, cf. FIG. 12 and Table 9 (FIG. 21). This is quite notable, as further optimization of our design is possible by optimizing it on the transistor level, with significant expected gains. The same applies to gate count and area, where a notable gap remains. Recall, however, that the Bin-comp design hides complexity by using more advanced gates and does not contain metastability.

We emphasize that we refrained from optimizing the design by making use of all available gates or devising transistor-level implementations, since such an approach is tied to the utilized library or requires design of standard cells.

In conclusion, we demonstrated that efficient metastability containing sorting circuits are possible. Our results indicate that optimized implementations can achieve the same delay as non-containing solutions, without a dramatic increase in circuit size. This is of high interest to an intended application motivating us to design MC sorting circuits: fault tolerant high-frequency clock synchronization. Sorting is a key step in envisioned implementations of the Lynch-Welch algorithm with improved precision of synchronization. The complete elimination of synchronizer delay is possible due to the efficient MC sorting networks presented in this article; enabling an increment of the rate at which clock corrections are applied, significantly reducing the negative impact of phase drift of local clock sources on the precision of the algorithm.

More generally speaking, MC circuits like those presented here are of interest in mixed signal control loops whose performance depends on very short response times. When analog control is not desirable, traditional solutions incur synchronizer delay before being able to react to any input change. Using MC logic saves the time for synchronization, while metastability of the output corresponds to the initial uncertainty of the measurement; thus, the same quality of the computational result can be achieved in shorter time. Note that our circuits are purely combinational, so they can be used in both clocked and asynchronous control logic.

Examples of such control loops are clock synchronization circuits, but MC has been shown to be useful for adaptive voltage control and fast routing with an acceptable low probability of data corruption as well.

The invention claimed is:

1. A metastability-containing sorting circuit,
the sorting circuit comprising a sorting network for sorting a number n of input strings, each string having length B,
wherein the input strings are Gray coded, wherein
the sorting network comprises at least two 2-sort circuits C for sorting each pair of input strings, and
wherein a size of the sorting circuit is within the order of the size of the input strings O(B) and a maximum fanout f≥3 of the sorting circuit is constant,
characterized in that
a depth of the sorting circuit is within the order of log(B).

2. The circuit of claim 1, wherein the Gray code is a binary reflected Gray code.

3. The circuit of claim 1, wherein buffers are used to bound the fanout.

4. A transistor-level implementation of the circuit of claim 1.

5. The circuit of claim 1, wherein a depth of the sorting circuit is $(\lceil \log(B) \rceil + k) d(C)$, where $k \in \{0, \ldots, \lceil \log(B) \rceil\}$
and $d(C)$ is a depth of a 2-sort circuit.

* * * * *